(12) United States Patent
Gu (10) Patent No.: US 12,286,179 B1
(45) Date of Patent: Apr. 29, 2025

(54) BICYCLE STORAGE RACK STRUCTURE

(71) Applicant: Haidong Gu, Montclair, CA (US)

(72) Inventor: Haidong Gu, Montclair, CA (US)

(73) Assignee: CYCLINGDEAL USA, INC., Montclair, CA (US)

( * ) Notice: Subject to any disclaimer, the term of this patent is extended or adjusted under 35 U.S.C. 154(b) by 0 days.

(21) Appl. No.: 18/595,465

(22) Filed: Mar. 5, 2024

(51) Int. Cl.
    *B62H 3/12*     (2006.01)
    *B62H 3/02*     (2006.01)
    *B62H 3/04*     (2006.01)

(52) U.S. Cl.
    CPC ............... *B62H 3/12* (2013.01); *B62H 3/02* (2013.01); *B62H 3/04* (2013.01)

(58) Field of Classification Search
CPC .... B62H 3/12; B62H 3/02; B62H 3/04; A47B 96/1425; A47F 5/0838
See application file for complete search history.

(56) References Cited

U.S. PATENT DOCUMENTS

| | | | | |
|---|---|---|---|---|
| 3,612,585 | A * | 10/1971 | Mayr | E04B 2/766 403/264 |
| 3,759,482 | A * | 9/1973 | Wright | A47B 97/08 248/449 |
| 3,901,612 | A * | 8/1975 | Canin | F16B 12/32 403/231 |
| 5,083,729 | A * | 1/1992 | Saeks | A47B 96/1425 248/200.1 |
| 5,833,192 | A * | 11/1998 | Buhrman | E03C 1/06 248/295.11 |
| 5,941,397 | A * | 8/1999 | Buchanan | B62H 3/12 211/19 |
| 6,820,842 | B1 * | 11/2004 | Chuang | A47B 96/1425 248/158 |
| 7,195,213 | B2 * | 3/2007 | Weatherly | A47B 81/061 248/125.1 |
| 8,100,600 | B2 * | 1/2012 | Blum | F16B 37/045 403/256 |
| 8,453,402 | B2 * | 6/2013 | Huang | E04B 2/96 52/656.5 |
| 8,474,632 | B2 * | 7/2013 | Yang | A47K 3/281 211/94.01 |
| 8,528,749 | B2 * | 9/2013 | Kerman | A47F 5/04 211/196 |
| 8,820,543 | B2 * | 9/2014 | Huang | F16B 45/00 248/230.4 |
| 9,228,693 | B2 * | 1/2016 | Ditges | F16M 11/24 |
| 2004/0025459 | A1 * | 2/2004 | Huebner | E04B 2/767 52/282.1 |

(Continued)

FOREIGN PATENT DOCUMENTS

TW      M337516      8/2008

*Primary Examiner* — Ko (Korie) H Chan
(74) *Attorney, Agent, or Firm* — Ying-Ting Chen (57) ABSTRACT

A bicycle storage rack structure is provided. The bicycle storage rack structure includes a plurality of pole bodies, wherein each of the plurality of pole bodies can be telescopically adjusted in length and assembled together, and each of the plurality of pole bodies has a sliding track recessed from one end to the other end of the pole body; at least one storage rack set, assembled on the sliding track, and movable and adjustable along the sliding track; and a pivoting base, disposed at the bottom end of the lowermost pole body among the plurality of pole bodies, and the pivoting base pivots relative to the pole body.

9 Claims, 12 Drawing Sheets

(56) References Cited

U.S. PATENT DOCUMENTS

| | | | |
|---|---|---|---|
| 2015/0157124 A1* | 6/2015 | Cipolla | A47F 7/0035 |
| | | | 211/186 |
| 2018/0231176 A1* | 8/2018 | Sabounjian | A47F 5/0838 |
| 2020/0305615 A1* | 10/2020 | Lawson | A47F 5/103 |

* cited by examiner

BICYCLE STORAGE RACK STRUCTURE

FIELD OF THE DISCLOSURE

The present disclosure is related to a bicycle storage rack structure, and more particularly to the technology applied in the field of bicycles. The present disclosure is mainly used to provide bicycles that can be displayed in a hanging manner, and the placement position can be adjusted according to the size of the bicycle to meet the needs of the environment and space.

BACKGROUND OF THE DISCLOSURE

Bicycles are one of the common means of transportation and can also be regarded as a type of fitness equipment. Many users are troubled by the bicycle parking which reduces the limited space in their houses. Furthermore, some users who take good care of their bicycles do not want to put their bicycles on the ground (it is easy to collide and tip over, causing scratches and dents on the surface, etc.). Therefore, some users will install facilities on the wall that can hang bicycles, such as TWM337516, entitled "Improved structure of bike hanger."

Although the above-mentioned bike hanger can hang a bicycle in the air to prevent the bicycle from tipping, the problem with this bike hanger is that it needs to damage the wall, and the hanger is directly mounted on the wall, so it cannot be adjusted according to the size and length of different bicycles. Furthermore, in general stores, exhibitions, etc., this type of hanger may not provide consumers with the best display view of bicycles.

SUMMARY OF THE DISCLOSURE

The main purpose of the bicycle storage rack structure of the present disclosure is to provide bicycles of different sizes and lengths for hanging and placement, so as to be adjusted to suit different environments and spaces, and to avoid the problem of overturning and collision injuries like bicycles placed directly on the floor.

Therefore, in order to achieve the above-mentioned objectives and effects, a bicycle storage rack structure is provided. The bicycle storage rack structure includes a plurality of pole bodies, wherein each of the plurality of pole bodies can be telescopically adjusted in length and assembled together, and each of the plurality of pole bodies has a sliding track recessed from one end to the other end of the pole body; at least one storage rack set, assembled on the sliding track, and movable and adjustable along the sliding track; and a pivoting base, disposed at the bottom end of the lowermost pole body among the plurality of pole bodies, and the pivoting base pivots relative to the pole body.

Accordingly, the present disclosure provides a bicycle storage rack structure with an adjustable length by assembling the pole bodies, and the structure has at least one storage rack set detachable assembled on the sliding track of the pole body. The user can adjust the position of the at least one storage rack set on the pole body according to the size and length of the bicycle, and various storage rack sets can also be arranged on each of the pole bodies to display various bicycles. The bicycle storage rack structure can keep the bicycles from tipping or collision and is also space-saving. Further, the structure also provides clear placement for shops, so that consumers can clearly view the bicycles.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

The present disclosure provides two embodiments, firstly, as shown in FIGS. 1-8, which is a first embodiment of the present disclosure. The present disclosure provides a bicycle storage rack structure, including a plurality of pole bodies 10, at least one storage rack set 20, and a pivoting base 30. Each of the plurality of pole bodies 10 is cylindrical and has different rod diameters, so that the plurality of pole bodies 10 can be telescopically adjusted in length and assembled together. Each of the plurality of pole bodies has a sliding track 101 recessed from one end to the other end of the pole body 10. The at least one storage rack set 20 is assembled on the sliding track 101, and movable and adjustable along the sliding track 101. The number of the at least one storage rack set 20 can be plural, as shown in the FIGS., for example, each of the uppermost pole body 10 and lowermost pole body 10 has two storage rack sets 20. The pivoting base 30 is disposed at the bottom end of the lowermost pole body 10 among the plurality of pole bodies 10, and the pivoting base 30 pivots relative to the pole body 10.

Figure 1:
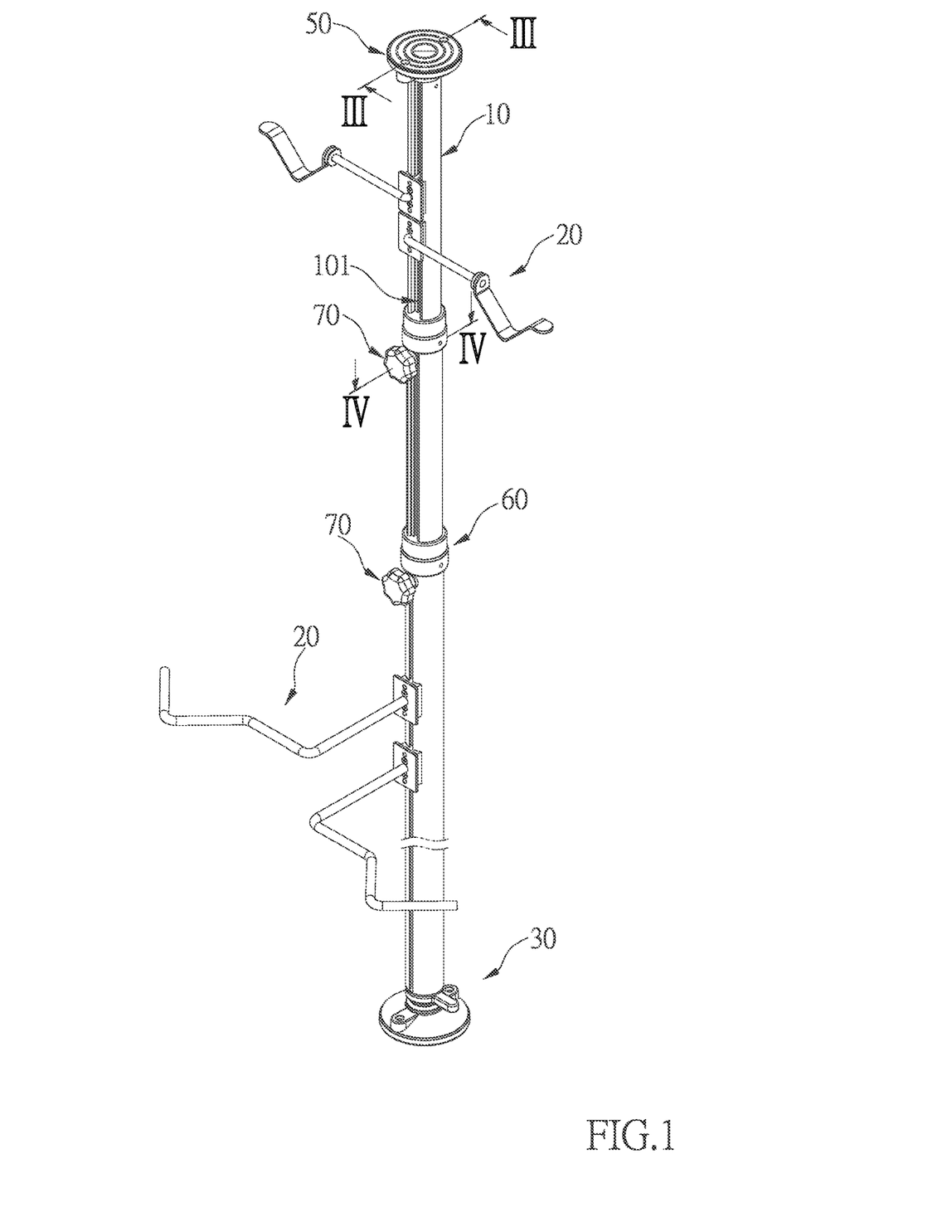
FIG. 1 is a perspective schematic view of the first embodiment of the present disclosure.

Accordingly, the user can adjust the height of the bicycle storage rack structure according to the height of the space. Indoors, the bicycle 100 is placed against the ceiling and the floor. The user adjusts the position of each storage rack set 20 and chooses the way to hang the bicycle 100 vertically or horizontally according to the user's needs, environment, and space constraints. In this way, there is no need to place the bicycle 100 on the floor, and it can avoid the problem of overturning, and the number of the storage rack set 20 can be increased or decreased according to the number of bicycles 100, and the type of the storage rack set 20 can be selected (such as two different styles of the storage rack set 20 as shown in FIG. 1). The bicycle storage rack structure allows more bicycles 100 to be neatly displayed and stored, so that customers can view clearly.

Figure 2:
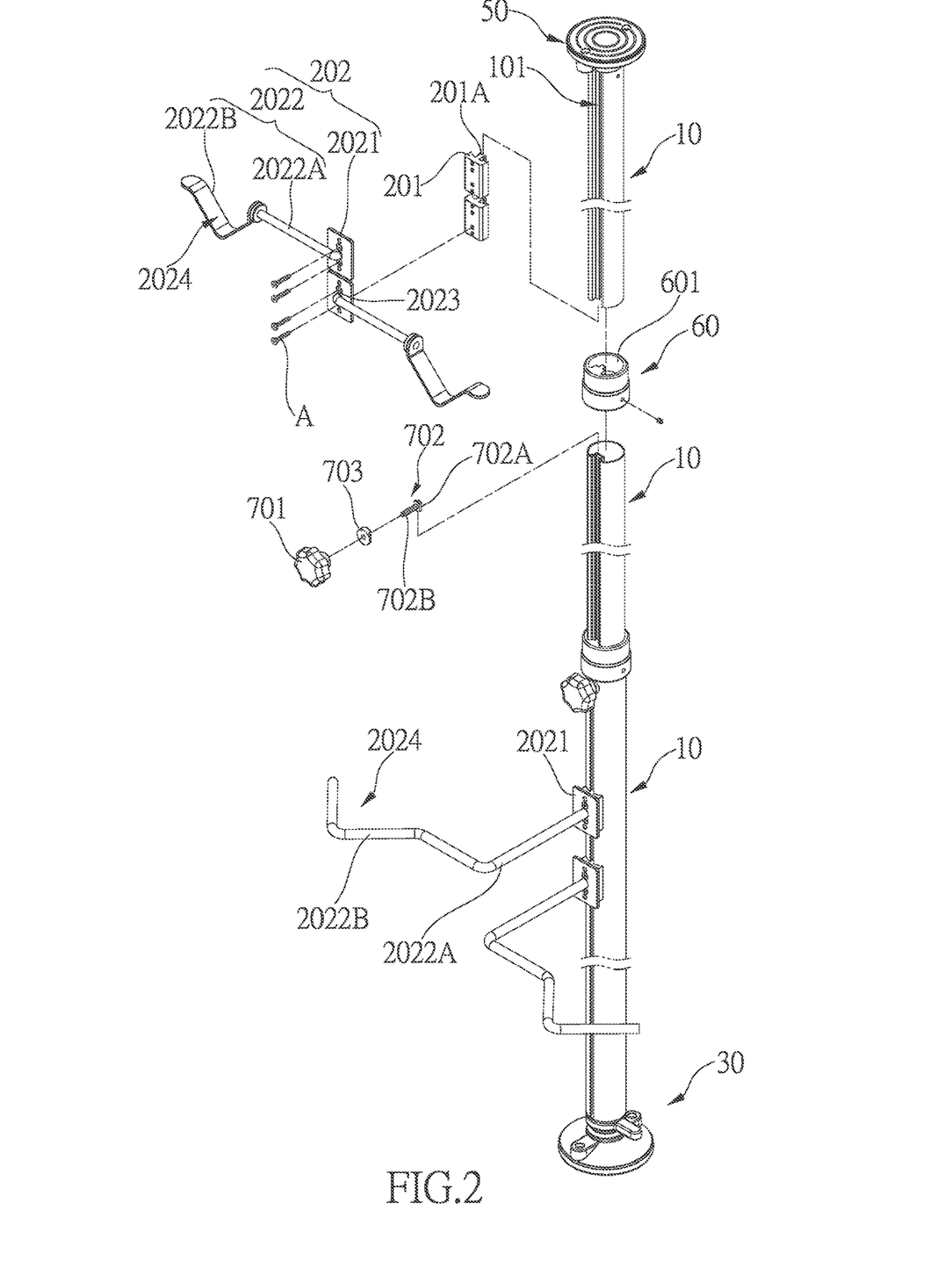
FIG. 2 is an exploded perspective schematic view of the first embodiment of the present disclosure.

As shown in FIG. 2, in order to allow the storage rack set 20 to slide stably on the sliding track 101 of each pole body 10, the sliding track 101 of each pole body 10 further includes a wide track portion 101A, a narrow track portion 101B and two baffles 101C, the wide track portion 101A are communicated with the narrow track portion 101B, and the two baffles 101C are disposed at a junction between the wide track portion 101A and the narrow track portion 101B. There is a distance between the two baffles 101C.

The at least one storage rack set 20 includes a sliding block 201 and a storage holder 202, the sliding block 201 has an engaging portion 201A matching the sliding track 101, the engaging portion 201A extends toward the narrow track portion 101B, and is limited by the two baffles 101C in the narrow track portion 101B. The sliding block 201 can only be removed from the sliding track 101 by sliding to the top or bottom end.

The storage holder 202 further includes a connecting portion 2021 and a holding rod portion 2022. The connecting portion 2021 has a plurality of fasten holes 2023 and one side the connecting portion 2021 is assembled on one end of the sliding block 201 and opposite to the engaging portion 201A. The holding rod portion 2022 has one end assembled on the connecting portion 2021, and a plurality of screws A are threadedly engaged with the plurality of fasten holes 2023, so that the holding rod portion 2022 is threadedly engaged on the sliding block 201. In addition to passing through each fasten hole 2023, each screw A can also be pressed against the bottom surface of the narrow track portion 101B in the corresponding sliding track 101.

Figure 5:
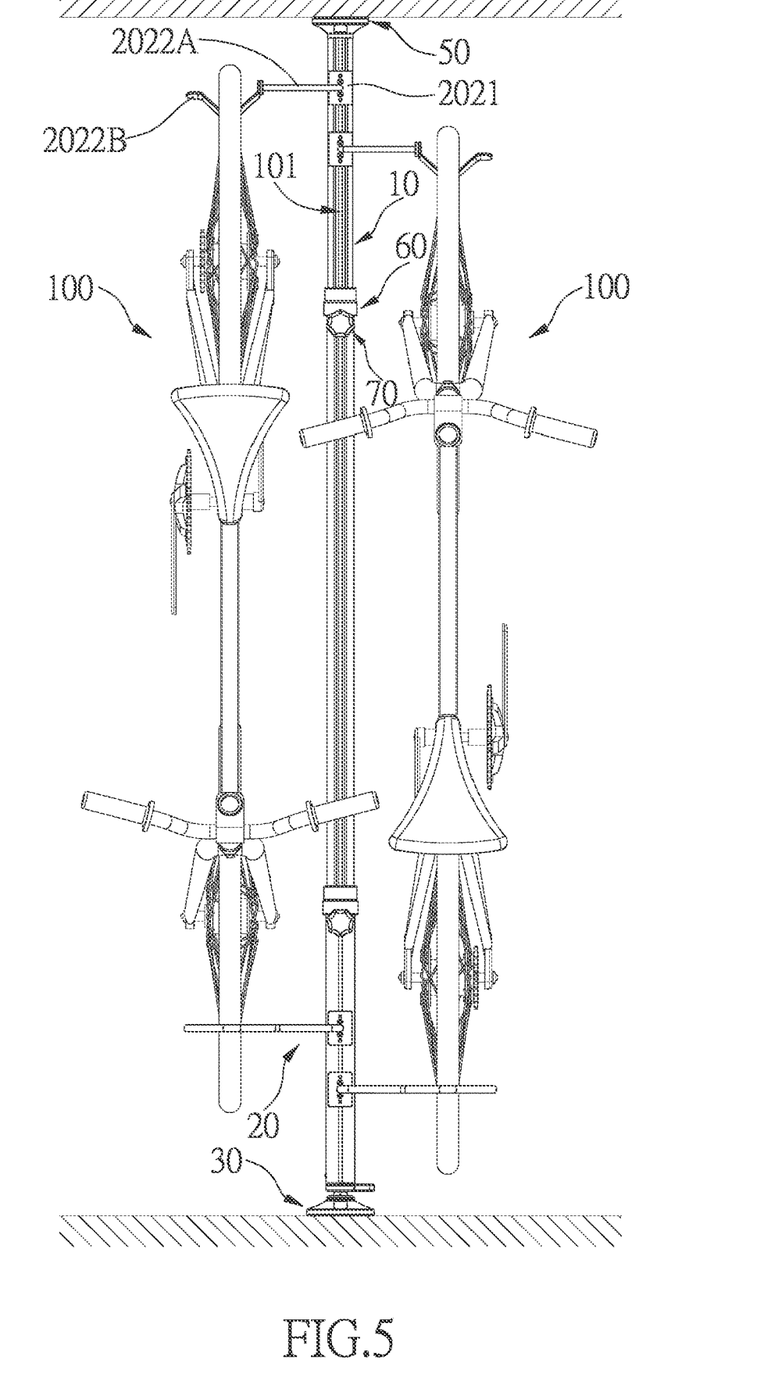
FIG. 5 is a schematic view of handing bicycles on the bicycle storage rack structure of the first embodiment of the present disclosure in practice.
Figure 6:
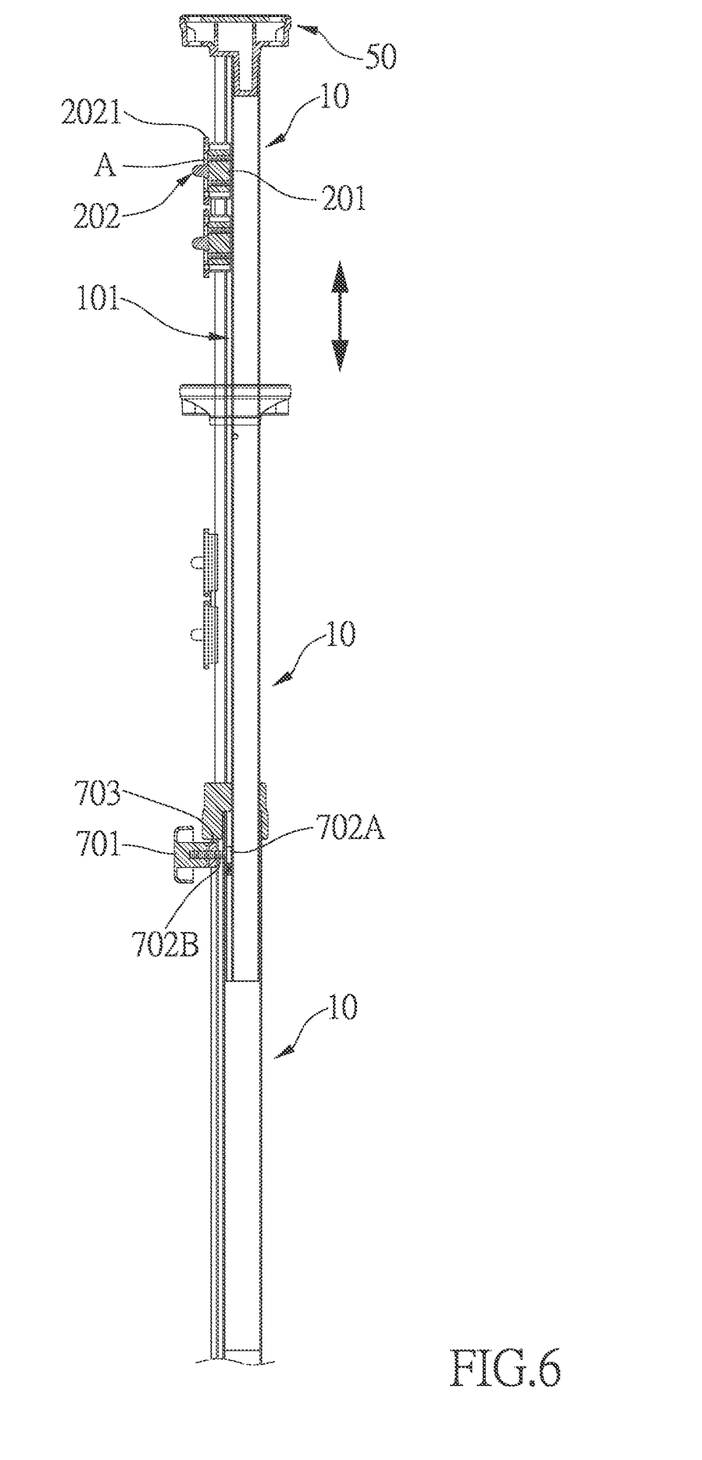
FIG. 6 is a schematic view of the movement of adjusting the pole bodies of FIG. 3.
Figure 7:
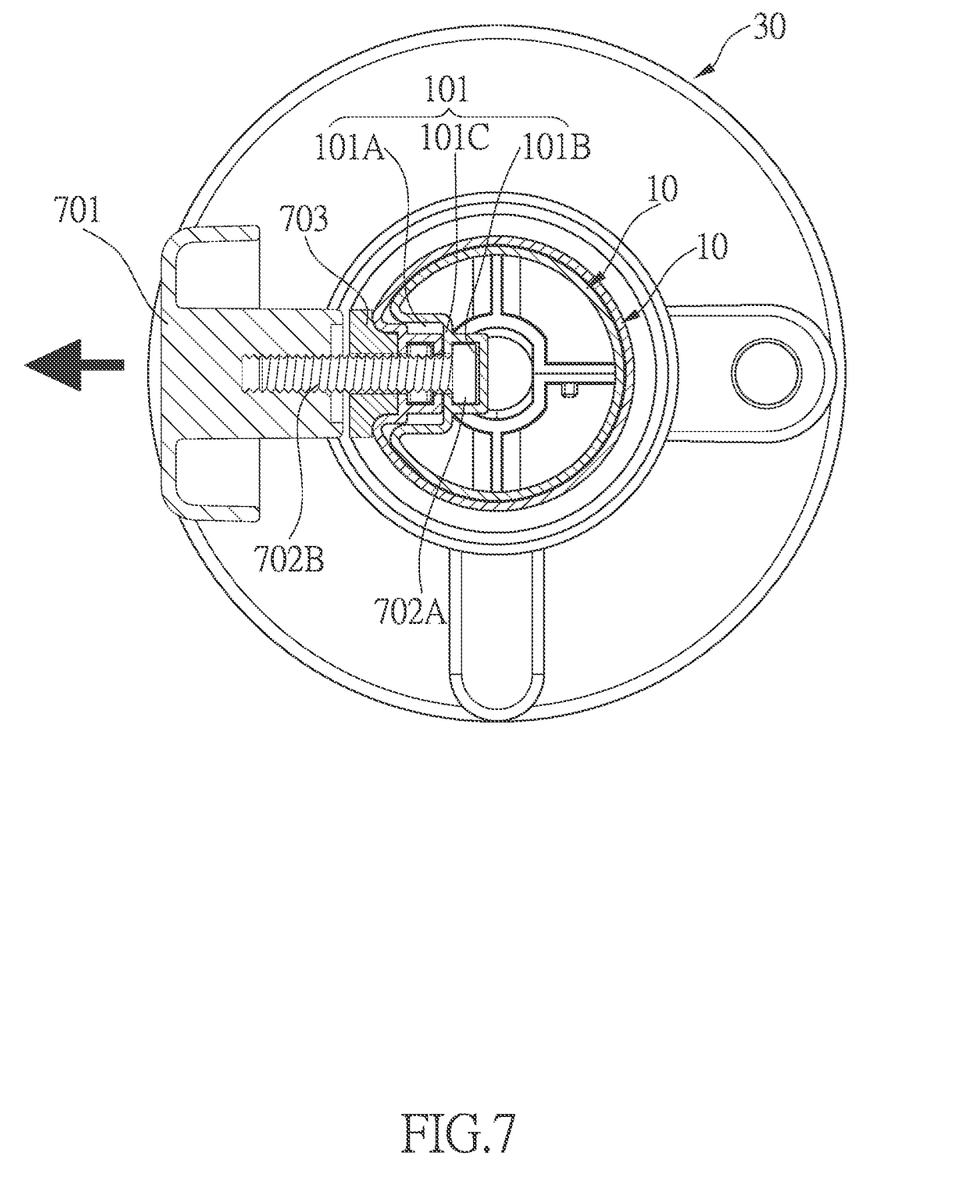
FIG. 7 is a schematic view of the movement of releasing the knob of FIG. 4.
Figure 8:
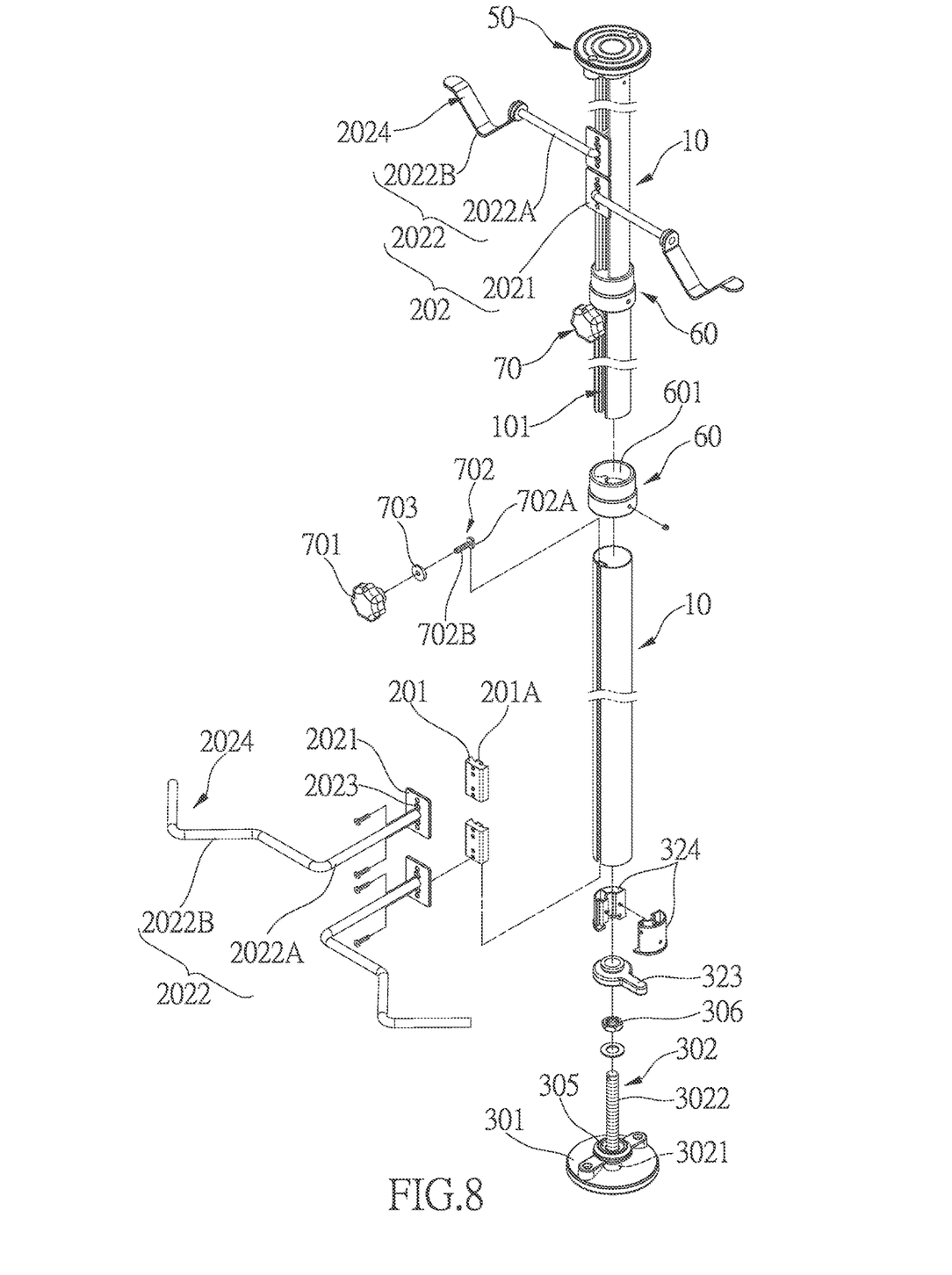
FIG. 8 is an exploded schematic view of the bicycle storage rack structure of the first embodiment of the present disclosure.

Further, the other end of the holding rod portion 2022 extends outward to form a curved holder 2024 for hanging a bicycle 100. It can be seen as shown in FIG. 5, firstly, the user can adjust the position of the storage rack set 20 and then further adjust the notch direction of the curved holder 2024 of the holding rod portion 2022, so as to adjust an appropriate position for hanging the bicycle 100.

Figure 9:
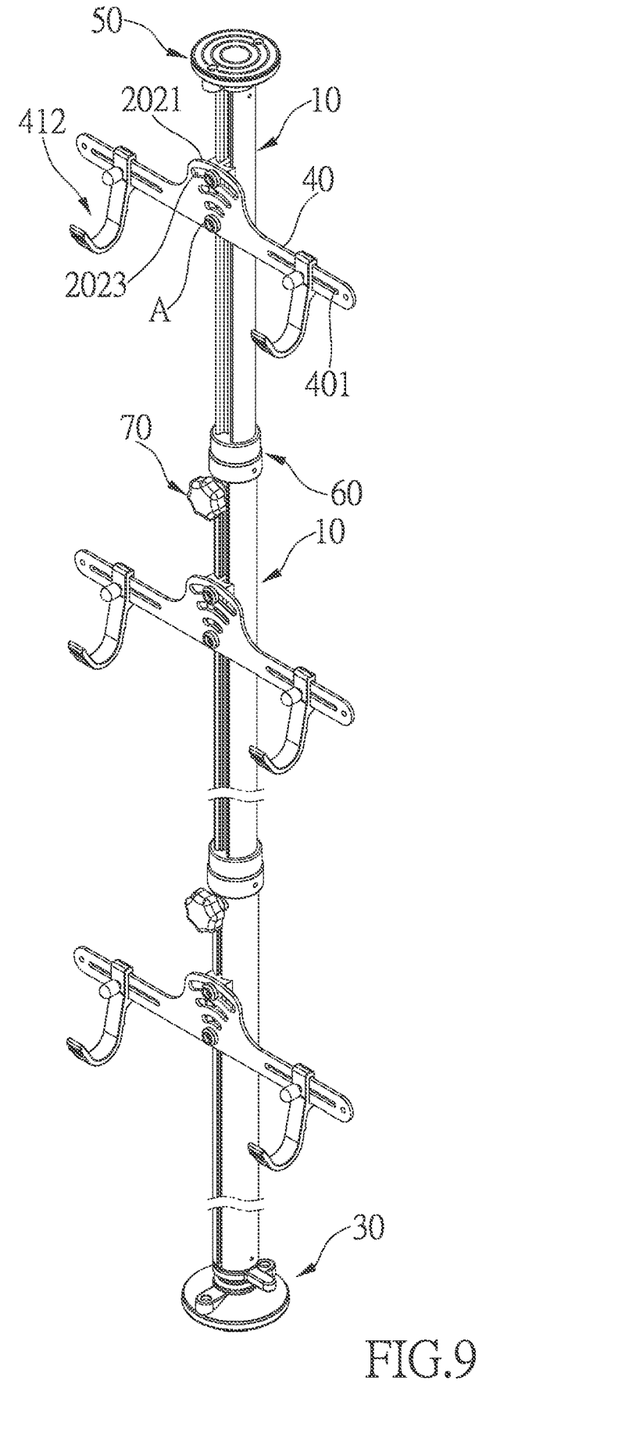
FIG. 9 is a perspective schematic view of the second embodiment of the present disclosure.
Figure 10:
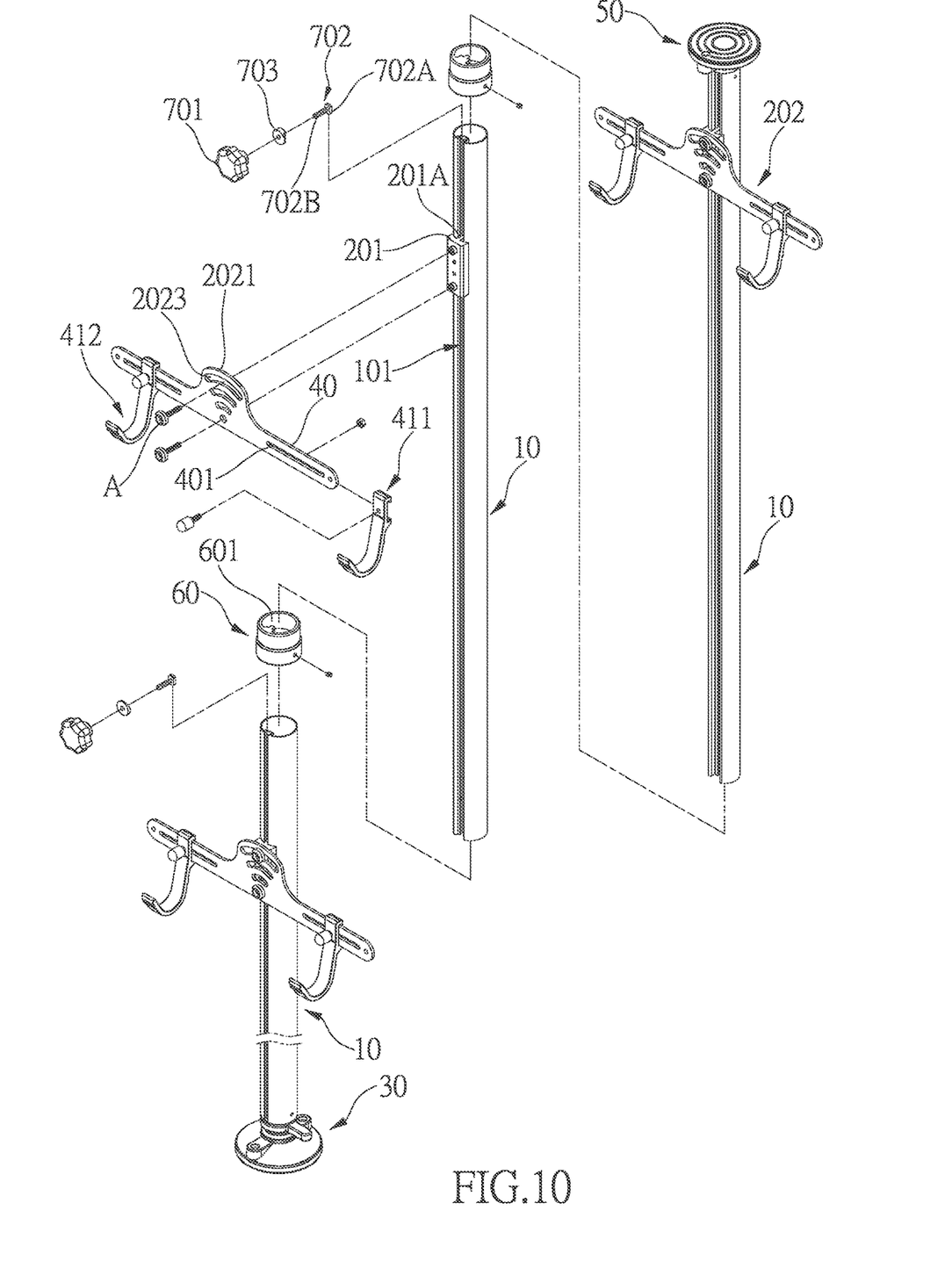
FIG. 10 is a partially exploded schematic view of the second embodiment of the present disclosure.
Figure 11:
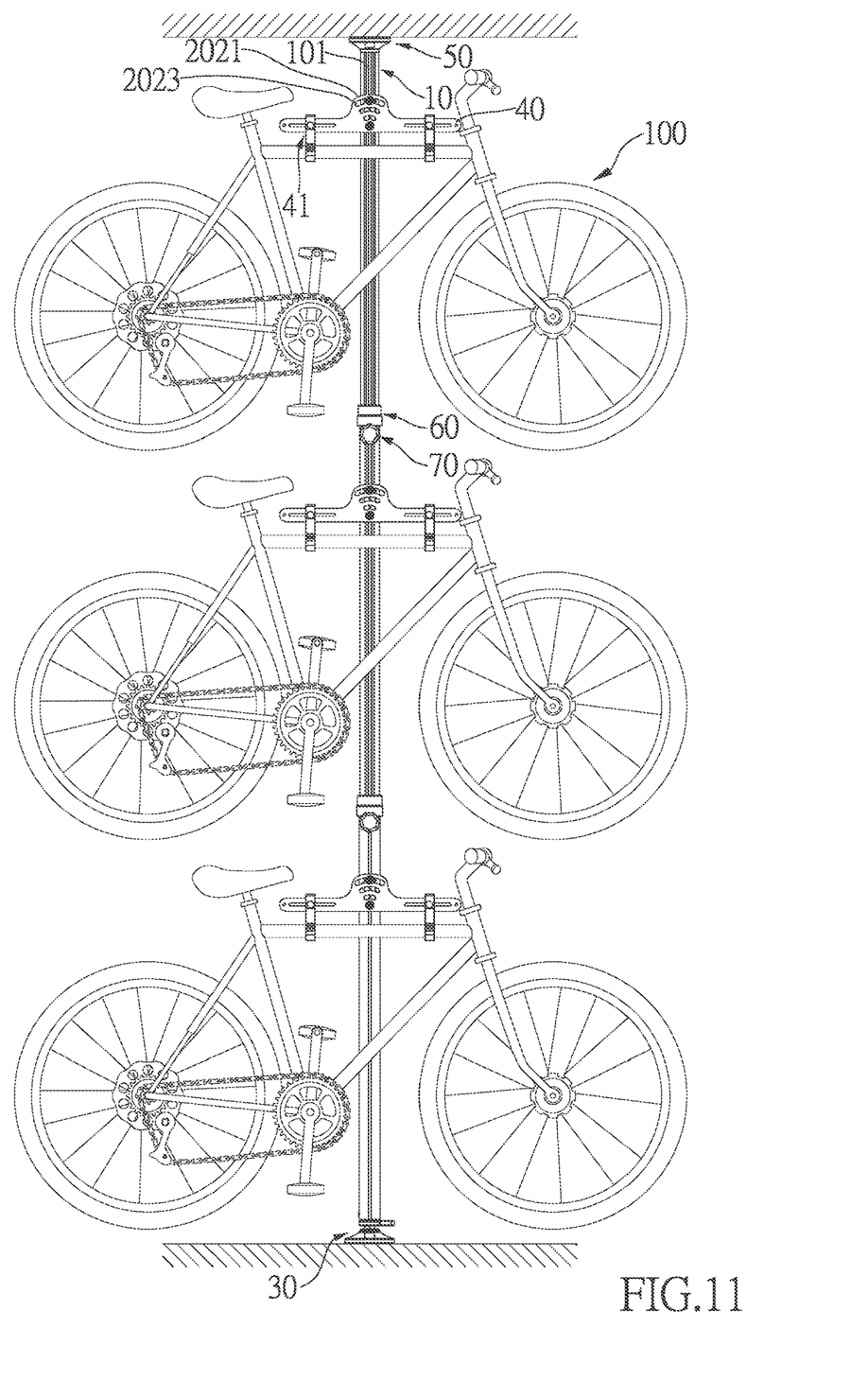
FIG. 11 is a schematic view of handing bicycles on the bicycle storage rack structure of the second embodiment of the present disclosure in practice.

Further, the present disclosure provides a second embodiment, as shown in FIGS. 9-11. The second embodiment mainly arranges the storage holder 202 in a plate-like shape. The storage holder 202 of the second embodiment includes a connecting portion 2021 and two holding hook portions 40. The connecting portion 2021 has one side assembled on one end of the sliding block 201 and opposite to the engaging portion 201A. The connecting portion 2021 has a plurality of fasten holes 2023 in a curved shape. In addition, the two holding hook portions 40 are respectively connected to both ends of the connecting portion 2021. At least one screw A is engaged with the at least one fasten hole 2023 and assembled on the sliding block 201; wherein each of the two holding hook portions 40 has a long through slit 401, and a plurality of holding hooks 41 being movable along the long through slit 401 and attached on the holding hook portion 40. Each of the plurality of holding hooks 41 has a hanger 411 on one end, and a hook portion 412 on the other end; wherein the hanger 411 and the hook portion 412 are curved in the opposite direction. Therefore, the holding hook 41 can be adjusted along the holding hook portion 40, so as to match hanging the bicycle 100 with different lengths on the hook space 412.

Moreover, in the first embodiment, the holding rod portion 2022 further can be divided into a support rod 2022A and a holding rod 2022B forming the curved holder 2024. The support rod 2022A has one end connected with the connecting portion 2021 and the other end connected with the holding rod 2022B. The holding rod 2022B can be adjusted and rotated, and the direction of the notch of the curved holder 2024 matches the bicycle 100 in different ways, as shown in FIG. 2.

Figure 2A:
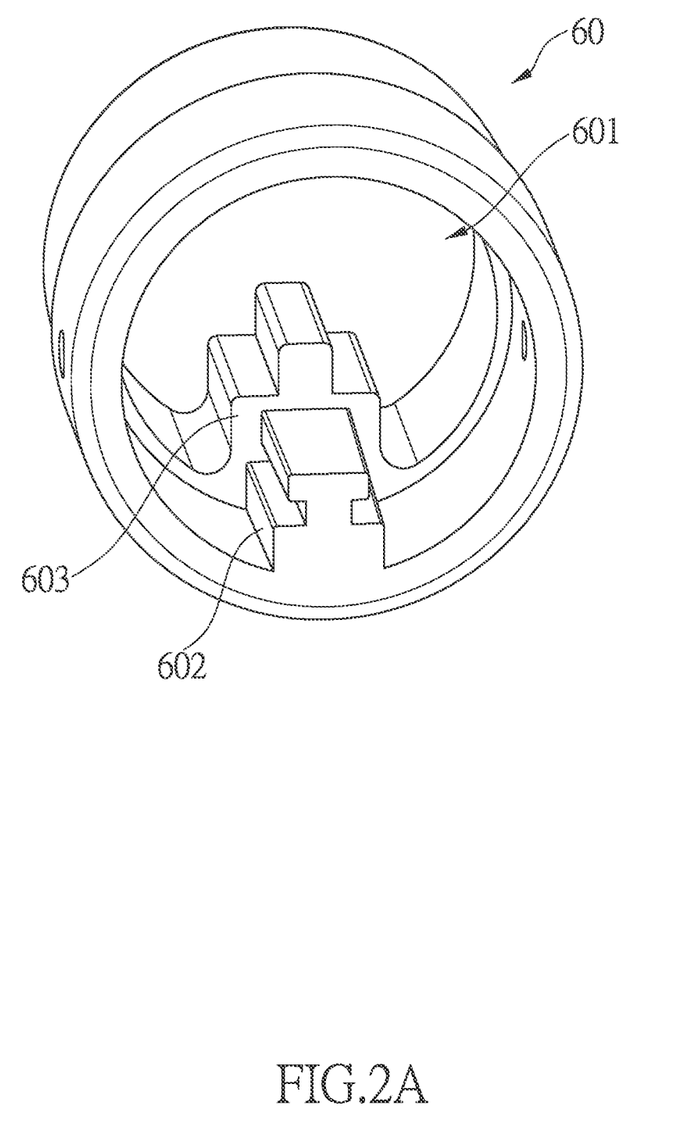
FIG. 2A is a schematic perspective view of another angel of the tube set of the present disclosure.
Figure 3:
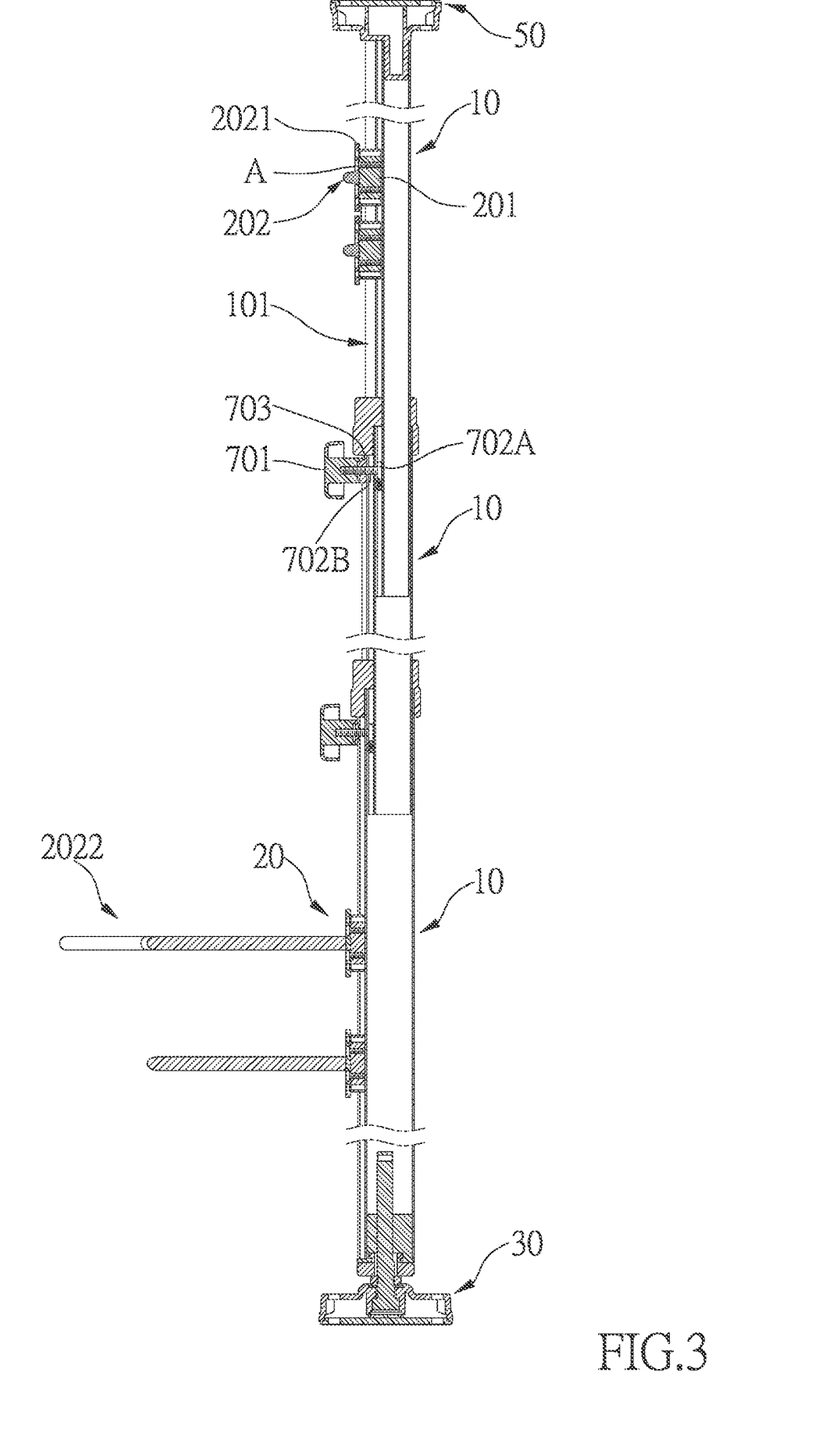
FIG. 3 is a sectional schematic view of line III-III of FIG. 1.

Furthermore, the uppermost pole body 10 further includes a top mounting member 50, so that the top mounting member 50 and the pivoting base 30 allow the plurality of pole bodies 10 to hold and stand in space after assembly, as shown in FIG. 1. Moreover, when the bicycle storage rack structure of the present disclosure is erected, in order to keep it firmly and avoid tipping, suitable weight, and stabilizing elements are also necessary. Therefore, the bicycle storage rack structure of the present disclosure further includes a plurality of tube set 60 disposed between the junction of the plurality of pole bodies 10 correspondingly; wherein the tube set 60 has a set hole 601 penetrating from one end to the other end, a first limit block 602 and a second limit block 603 on the inner wall of the tube set; wherein the first limit block 602 and a second limit block 603 are fittingly engaged with the sliding tracks 101 of the plurality of pole bodies 10 correspondingly. The shape and size of the first limit block 602 and the second limit block 603 are not the same, but they match the shape of the sliding track 101 of the corresponding pole body 10, so that the shape difference prevents rotation between the pole bodies 10 and change the direction consistency of each sliding track 101 between the pole bodies 10.

Figure 4:
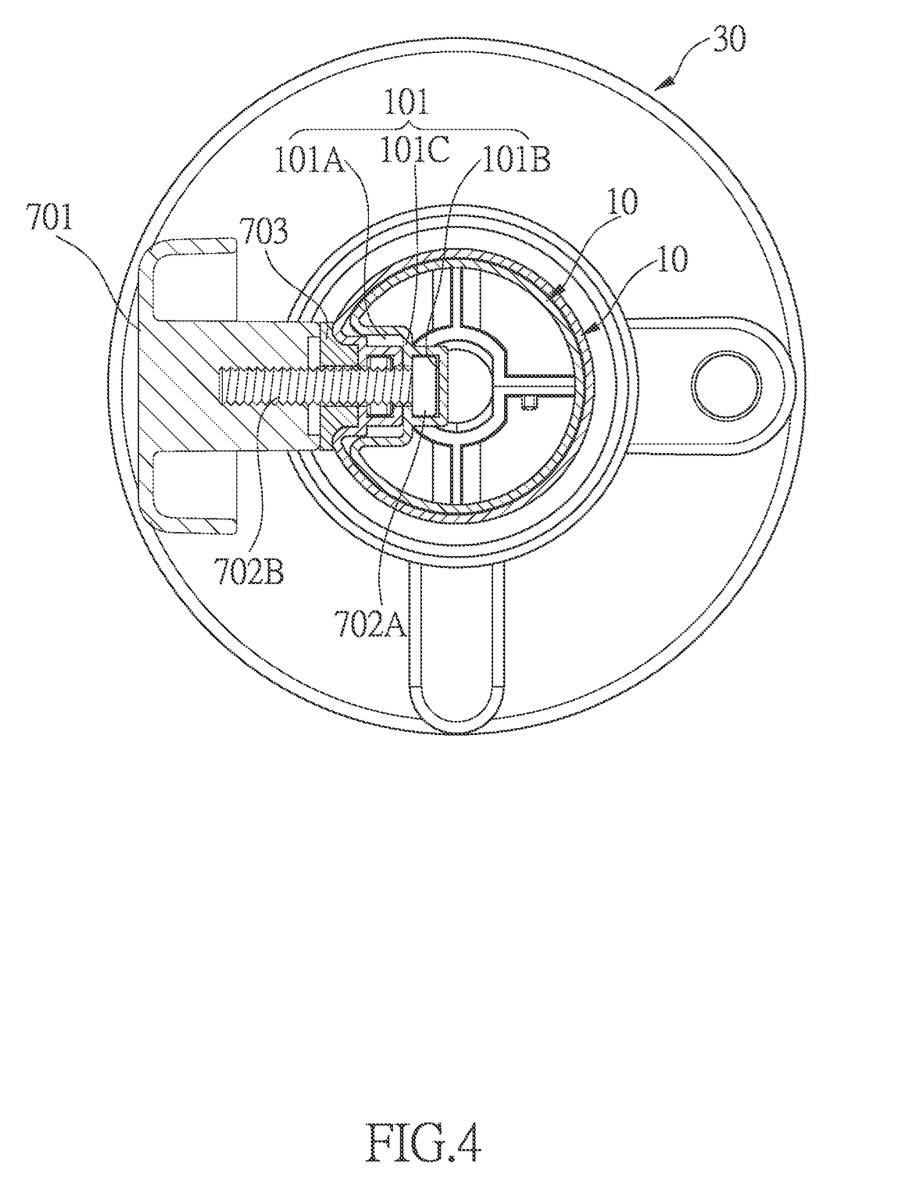
FIG. 4 is a sectional schematic view of line IV-IV of FIG. 1.

Further, a plurality of stoppers 70 are assembled on each pole body 10 and located below each tube set 60. Each of the plurality of stoppers 70 includes a knob 701, a limit bolt 702, and a gasket 703. The limit bolt 702 has a bolt head 702A and a bolt thread 702B, the bolt head 702A is disposed in the narrow track portion 101B, and the bolt thread 702B has one end connecting to the bolt head 702A and the other end penetrating the wide track portion 101A of one pole body 10 and passing through the sliding track 101 of another pole body 10 and located at the wide track portion 101A, wherein one end of the knob is connected to one end of the bolt thread of the limit bolt that protrudes to the wide track portion, and the gasket is sleeved on the bolt thread and located between the knob and the pole body; wherein the rotation of the knob relative to the limit bolt tightens or relaxes the assembly between the pole bodies. In this way, the adjusted lengths between each pole body 10 can be firmed to avoid sudden shortening, as shown in FIG. 4.

Lastly, in order to facilitate the user to stand the structure of the present disclosure to firmly support between the ceiling and the floor, the pivoting base 30 further includes a base pad 301, a screw adjustment piece 302, a control piece 303, and a plug sleeve 304. The base pad 301 has a socket hole 305 at the top, the screw adjustment piece 302 has a screw head portion 3021 embedded in the socket hole 305, and a screw thread portion 3022 connected to the screw head portion 3021 with one end of the screw thread portion 3022. The control piece 303 is threadedly engaged with the other end of the screw thread portion 3022, and the plug sleeve 304 covers part of the screw thread portion 3022 and the control piece 303. The plug sleeve 304 is plugged at the end of the lowest pole body 10 among the pole bodies 10, and a nut 306 is screwed on the screw thread portion 3022 and between the base pad 301 and the pole body 10. The nut 306 screws relative to the screw thread portion 3022 to drive the threaded length of the screw adjustment piece 302 relative to the pole body 10. The user only needs to screw the nut 306 after the structure is erect, so that the threaded length of the screw adjustment piece 302 relative to the pole body 10 is changed. In this way, the structure of the present disclosure can be firmly supported between the ceiling and the floor, and the direction of the sliding track 101 of each pole body 10 can also be changed during the adjustment process.

What is claimed is:

1. A bicycle storage rack structure, comprising:
   a plurality of pole bodies, wherein each of the plurality of pole bodies can be telescopically adjusted in length and assembled together, and each of the plurality of pole bodies has a sliding track recessed from one end to the other end of the pole body;
   at least one storage rack set, assembled on the sliding track, and movable and adjustable along the sliding track;
   a pivoting base, disposed at the bottom end of the lowermost pole body among the plurality of pole bodies, and the pivoting base pivots relative to the pole body; and
   a plurality of tube sets disposed between the junction of the plurality of pole bodies correspondingly;
   wherein the sliding track further includes a wide track portion, a narrow track portion, and two baffles, the wide track portion are communicated with the narrow track portion, and the two baffles are disposed at a junction between the wide track portion and the narrow track portion; wherein the at least one storage rack set includes a sliding block and a storage holder;
   wherein the tube set has a set hole penetrating from one end to the other end, a first limit block and a second limit block on the inner wall of the tube set; wherein the first limit block and a second limit block are fittingly engaged with the sliding tracks of the plurality of pole bodies correspondingly.

2. The bicycle storage rack structure according to claim 1, wherein the sliding block has an engaging portion matching the sliding track, the engaging portion extends toward the narrow track portion and is limited by the two baffles in the narrow track portion.

3. The bicycle storage rack structure according to claim 2, wherein the storage holder further includes a connecting portion and a holding rod portion; wherein the connecting portion has a plurality of fasten holes and one side the connecting portion is assembled on one end of the sliding block and opposite to the engaging portion; wherein the holding rod portion has one end assembled on the connecting portion and the other end extending outward to form a curved holder; wherein a plurality of screws are threadedly engaged with the plurality of fasten holes.

4. The bicycle storage rack structure according to claim 2, wherein the storage holder further includes a connecting portion and two holding hook portions; wherein the connecting portion has at least one fasten hole and one side of the connecting portion is assembled on one end of the sliding block and opposite to the engaging portion; wherein at least one screw is engaged with the at least one fasten hole and assembled on the sliding block; wherein each of the two holding hook portions has a long through slit, and a plurality of holding hooks being movable along the long through slit and attached on the holding hook portion.

5. The bicycle storage rack structure according to claim 1, wherein the uppermost pole body further includes a top mounting member, so that the top mounting member and the pivoting base allow the plurality of pole bodies to hold and stand in space after assembly.

6. The bicycle storage rack structure according to claim 1, further including a plurality of stoppers assembled on each pole body and located below each tube set; wherein the stopper includes a knob, a limit bolt, and a gasket; wherein the limit bolt has a bolt head and a bolt thread, the bolt head is disposed in the narrow track portion, and the bolt thread has one end connecting to the bolt head and the other end penetrating the wide track portion of one pole body and passing through the sliding track of another pole body and located at the wide track portion; wherein one end of the knob is connected to one end of the bolt thread of the limit bolt that protrudes to the wide track portion, and the gasket is sleeved on the bolt thread and located between the knob and the pole body; wherein the rotation of the knob relative to the limit bolt tightens or relaxes the assembly between the pole bodies.

7. The bicycle storage rack structure according to claim 3, the holding rod portion further includes a support rod and a holding rod forming the curved holder; wherein the support rod has one end connected with the connecting portion and the other end connected with the holding rod.

8. The bicycle storage rack structure according to claim 4, wherein each of the plurality of holding hooks has a hanger on one end, and a hook portion on the other end; wherein the hanger and the hook portion are curved in the opposite direction.

9. The bicycle storage rack structure according to claim 1, wherein the pivoting base further includes a base pad, a screw adjustment piece, a control piece, and a plug sleeve; wherein the base pad has a socket hole at the top, the screw adjustment piece has a screw head portion embedded in the socket hole, and a screw thread portion connected to the screw head portion at one end of the screw thread portion; wherein the control piece is threadedly engage with the other end of the screw thread portion, and the plug sleeve covers part of the screw thread portion and the control piece; wherein the plug sleeve is plugged at the end of the lowermost pole body among the pole bodies, and a nut is screwed on the screw thread portion and between the base pad and the pole body; wherein the nut screws relative to the screw thread portion to drive the threaded length of the screw adjustment piece relative to the pole body.

* * * * *